US008798925B2

(12) United States Patent
Kellar

(10) Patent No.: US 8,798,925 B2
(45) Date of Patent: Aug. 5, 2014

(54) SYSTEM AND METHOD OF DETERMINING AN UNAMBIGUOUS HEADING DIRECTION OF A VEHICLE

(75) Inventor: William James Kellar, Dutton Park (AU)

(73) Assignee: Leica Geosystems AG, Heerbrugg (CH)

( * ) Notice: Subject to any disclaimer, the term of this patent is extended or adjusted under 35 U.S.C. 154(b) by 0 days.

(21) Appl. No.: 13/810,960

(22) PCT Filed: Jul. 19, 2011

(86) PCT No.: PCT/AU2011/000918
§ 371 (c)(1),
(2), (4) Date: May 5, 2013

(87) PCT Pub. No.: WO2012/009758
PCT Pub. Date: Jan. 26, 2012

(65) Prior Publication Data
US 2013/0211716 A1  Aug. 15, 2013

(30) Foreign Application Priority Data

Jul. 20, 2010  (AU) .................. 2010903232

(51) Int. Cl.
*G01C 21/00*  (2006.01)
(52) U.S. Cl.
USPC ............ 701/505; 701/500; 701/501; 701/472
(58) Field of Classification Search
USPC ................... 701/472, 500, 501, 505
See application file for complete search history.

(56) References Cited

U.S. PATENT DOCUMENTS

| 5,877,723 | A | 3/1999 | Fan |
| 5,928,309 | A | 7/1999 | Korver et al. |
| 6,282,496 | B1 * | 8/2001 | Chowdhary .................. 701/446 |
| 7,451,029 | B2 | 11/2008 | McLaren et al. |
| 8,346,466 | B2 * | 1/2013 | Chueh et al. .................. 701/472 |
| 2002/0008661 | A1 | 1/2002 | McCall et al. |
| 2002/0128775 | A1 * | 9/2002 | Brodie et al. ................. 701/216 |
| 2003/0216864 | A1 * | 11/2003 | Fukuda et al. ................ 701/216 |
| 2005/0060093 | A1 | 3/2005 | Ford et al. |
| 2009/0063051 | A1 * | 3/2009 | Watanabe et al. ............. 701/216 |
| 2009/0326740 | A1 * | 12/2009 | Wang ............................... 701/3 |
| 2010/0109945 | A1 | 5/2010 | Roh |

FOREIGN PATENT DOCUMENTS

| EP | 1 787 889 A1 | 5/2007 |
| GB | 2 323 989 A | 10/1998 |

* cited by examiner

*Primary Examiner* — Thomas Black
*Assistant Examiner* — Peter D Nolan
(74) *Attorney, Agent, or Firm* — Maschoff Brennan

(57) ABSTRACT

An unambiguous heading direction is calculated to determine the forward/reverse state of a vehicle. A heading alignment error is determined at step 100, being the difference between a GNSS direction of motion and the unresolved IMU heading of the vehicle. The heading alignment error is adjusted by 180° to be within a predetermined range at step 200. The unresolved IMU heading of the vehicle 10 is adjusted using the heading alignment error to determine an ambiguous error corrected IMU heading at step 300. Step 400 determines whether the ambiguous error corrected IMU heading is substantially in the true direction of the nose of the vehicle. The unambiguous heading direction is calculated at step 500 by offsetting the ambiguous error corrected IMU heading by 180 degrees if the ambiguous error corrected IMU heading is substantially opposite the true direction of the nose the vehicle of the vehicle. The forward/reverse state is determined by comparing the unambiguous heading direction with the GNSS direction of motion of the vehicle.

17 Claims, 8 Drawing Sheets

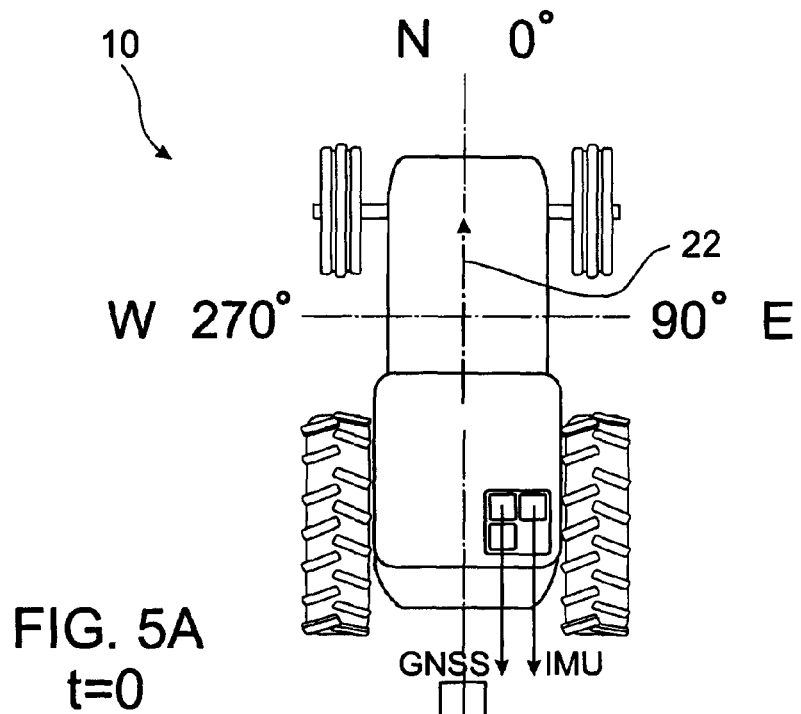
FIG. 5A  t=0
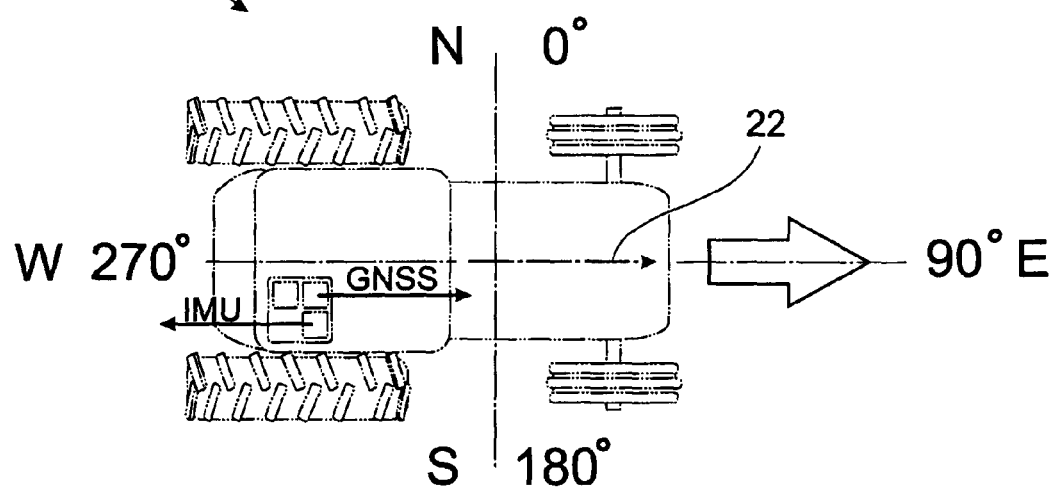
FIG. 5B  t+1

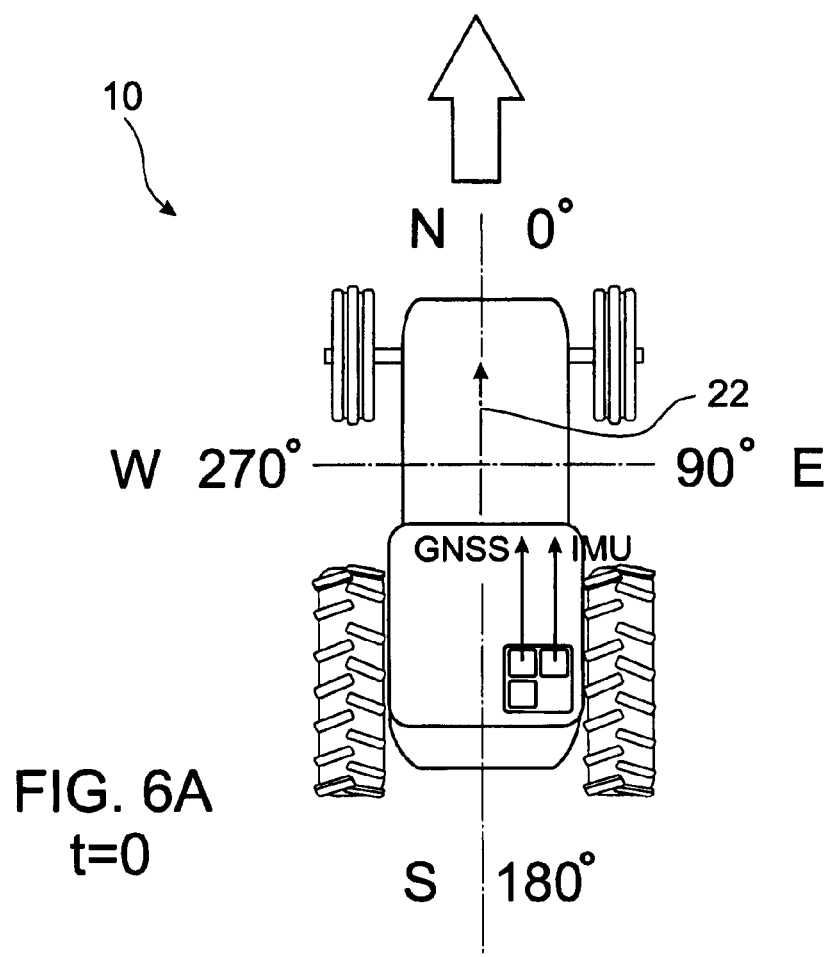
FIG. 6A  t=0
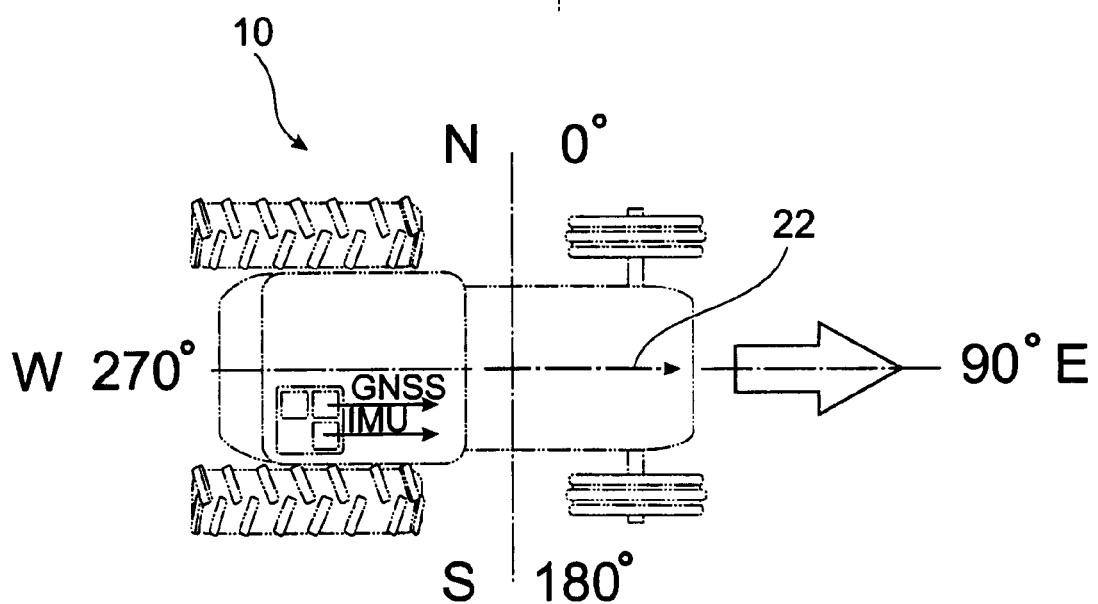
FIG. 6B   t+1

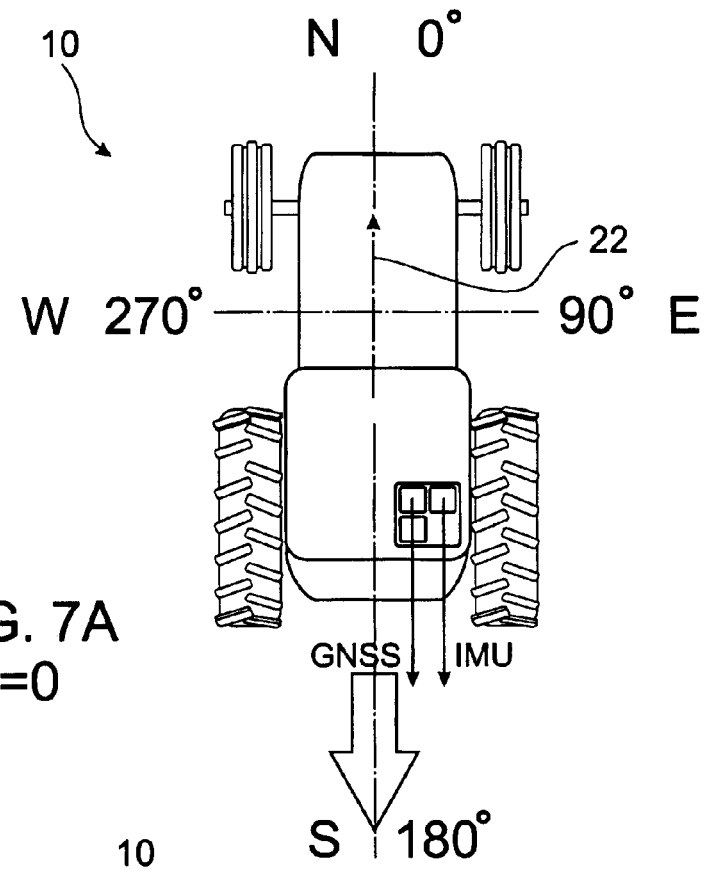
FIG. 7A
t=0
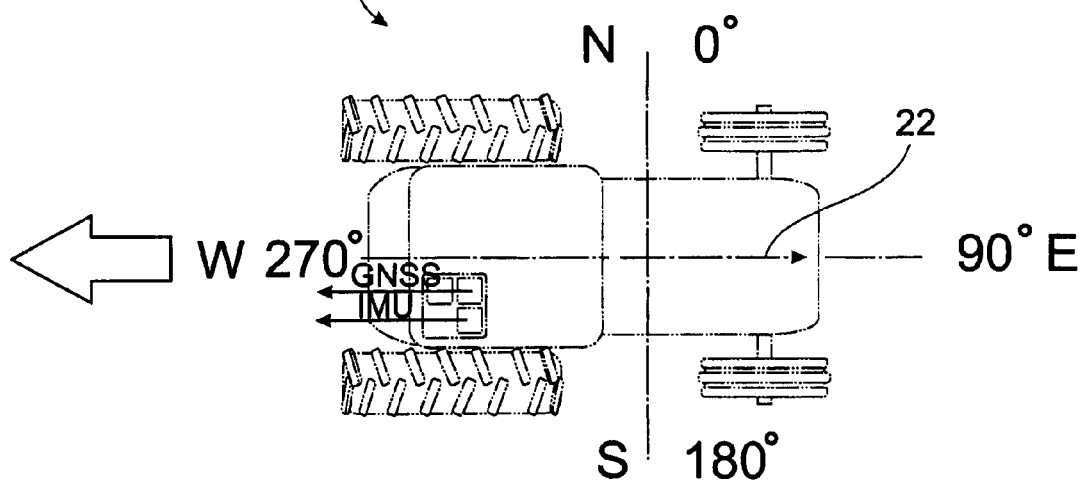
FIG. 7B    t+1

SYSTEM AND METHOD OF DETERMINING AN UNAMBIGUOUS HEADING DIRECTION OF A VEHICLE

FIELD OF THE INVENTION

The invention relates to a method and system of determining an unambiguous heading direction of a vehicle. In particular, the invention relates to determination of a vehicle's forward/reverse state by using the unambiguous heading direction of the vehicle.

BACKGROUND TO THE INVENTION

Knowing whether a vehicle is travelling forward or in reverse (the forward/reverse state) is integral to automatic steering systems for vehicles. For example, if a vehicle is travelling forward, angling of the wheels to make the vehicle veer left would rotate the vehicle to the right if the vehicle was in fact travelling in reverse. The correct forward/reverse state is thus a crucial input to a safe and effective automatic steering system.

There are a number of prior art systems for determining forward/reverse state. These include a vehicle transmission sensor as taught in U.S. Pat. No. 7,451,029 and the direction determination system of EP 1787889 using yaw rate and change in steering position. A vehicle transmission sensor has the drawback that the vehicle may still be travelling momentarily forwards when a reverse gear is already engaged. Using yaw rate and change in steering position is dependant on the accuracy of the yaw rate and steering position sensors.

Certain prior art systems use the signals from both an Inertial Measurement Unit (IMU) and a GNSS unit such as a GPS receiver mounted to the vehicle to determine if the vehicle is travelling forward or in reverse. An IMU provides the IMU heading of the vehicle and the GPS receiver the direction of motion for the vehicle. The heading of the vehicle is the direction the nose of the vehicle is pointing. If the IMU heading and the direction of motion of the vehicle are opposite each other, then the vehicle is determined to be travelling in reverse. Conversely, if the IMU heading and the direction of motion of the vehicle are in the same direction then the vehicle is determined to be travelling forwards.

IMU's may require coarse alignment at startup and a typical method for coarse alignment is to take the first GPS direction of motion for the vehicle as the heading of the vehicle. The IMU heading at coarse alignment is thus taken to be the GPS direction of motion at startup. The first action of the vehicle at startup is often reversing the vehicle out of a barn or shed, resulting in the coarse alignment of the IMU heading being approximately 180° offset from the true heading of the vehicle. There may be other reasons that the coarse alignment of the IMU is incorrect.

An unresolved IMU heading at any given time after startup is generally calculated as the coarse alignment IMU heading adjusted by angular change since startup measured by a gyro of the IMU. The calculated unresolved IMU heading is typically corrected recursively over multiple epochs using an error term derived from the difference between the unresolved IMU heading and the GPS direction of motion. The error term is typically the product of a constant "A" and a heading alignment error. The heading alignment error is the difference between the unresolved IMU heading and a GPS direction of motion. When a vehicle changes from forward to reverse the unresolved IMU heading will generally stay the same, but the GPS direction of motion will swing around by 180°. The heading alignment error will thus jump by 180° when the vehicle changes from forward to reverse. Large error terms, due to large heading alignment errors, are detrimental to accurate approximation of the true heading of the vehicle.

A known solution to avoid the 180° jump in heading alignment error is to detect the forwards/reverse state of the vehicle before calculating the heading alignment error. The GPS direction of motion used in determining the heading alignment error can then be adjusted by 180° if the vehicle changes from forwards to a reverse state, avoiding the 180° jump in heading alignment error. For example, if a vehicle is travelling forward, its unresolved IMU heading and GPS direction of motion will typically only differ by a few degrees and the heading alignment error between the two is thus small. When the vehicle starts moving in reverse the IMU heading and GPS direction of motion are now substantially opposite each other and the heading alignment error will be close to 180°. The known solution to avoid the large 180° jump in heading alignment error is to adjust the GPS direction of motion by 180° when detecting the reverse state of the vehicle and before calculating the heading alignment error. The adjusted GPS direction of motion and unresolved IMU heading thus remains close to each other even when the vehicle is travelling in reverse and the heading alignment error remains relatively small. This kind of solution is completely dependant on correctly detecting the forwards/reverse state of the vehicle prior to the heading alignment error being calculated. The forwards/reverse state can not always be reliable detected as discussed. Detecting changes in GPS direction of motion becomes difficult at very low speeds because of the amount of noise on the velocity measurement, and can give bad direction of motion when speed drops below roughly 0.5 km/h. For large vehicles where the GPS antenna is mounted several meters from the vehicle centre of rotation, small changes in vehicle rotation (due to rough terrain or vehicle movements due to applying the brake and bouncing on suspension or tyres) can manifest as large changes in velocity at the antenna which is not indicative of the actual velocity of the vehicle.

There is a need for robust and accurate forward/reverse state determination for use with automatic steering systems.

SUMMARY OF INVENTION

In one form, the invention resides in a method of determining an unambiguous heading direction of a vehicle, the method including:

determining a heading alignment error being the difference between a GNSS direction of motion of the vehicle and an unresolved IMU heading of the vehicle;

adjusting the heading alignment error by 180 degrees to be within a predetermined range if the error is outside the predetermined range;

adjusting the unresolved IMU heading of the vehicle using the heading alignment error;

determining whether the unresolved IMU heading, after heading alignment error adjustment, is substantially in the true direction of the nose of the vehicle or substantially opposite to the true direction of the nose of the vehicle;

calculating an unambiguous heading direction by offsetting the unresolved IMU heading, after heading alignment error adjustment, by 180 degrees if the unresolved IMU heading is substantially opposite to the true direction of the nose of the vehicle.

The method preferably includes determining if the vehicle is travelling in forward or reverse by comparing the unambiguous heading direction with the GNSS direction of motion of the vehicle.

Adjusting the unresolved IMU heading of the vehicle using the heading alignment error preferably comprises calculating an ambiguous error corrected IMU heading using the heading alignment error.

The unambiguous heading direction is preferably calculated as being either:
  the ambiguous error corrected IMU heading; or
  the ambiguous error corrected IMU heading offset by 180 degrees, if the ambiguous error corrected IMU heading was determined to be substantially opposite to the true direction of the nose of the vehicle.

Adjusting the unresolved IMU heading may comprise calculating an error corrected GNSS direction of motion using the heading alignment error.

Preferably, the method includes determining that the vehicle is travelling in reverse if the unambiguous heading direction is in substantially the opposite direction to the GNSS direction of motion.

Determining whether the ambiguous error corrected IMU heading is substantially in the true direction of the nose of the vehicle or substantially opposite to the true direction of the nose of the vehicle preferably includes approximating the true heading of the vehicle using one or more absolute heading tests or relative vehicle motion tests.

Determining whether the ambiguous error corrected IMU heading is substantially in the true direction of the nose of the vehicle or substantially in the opposite direction to the true direction of the nose of the vehicle preferably further includes comparing the approximated true heading of the vehicle with the ambiguous error corrected IMU heading.

In another form, the invention resides in a method of determining if a vehicle is travelling forward or in reverse, the method including:
  receiving a GNSS direction of motion for the vehicle from a GNSS unit of the vehicle;
  receiving an unresolved IMU heading of the vehicle from an IMU of the vehicle;
  determining a heading alignment error being the difference between the GNSS direction of motion and the unresolved IMU heading;
  adjusting the heading alignment error by 180 degrees to be within a predetermined range if the heading alignment error is outside the predetermined range;
  calculating an ambiguous error corrected IMU heading using the heading alignment error;
  determining whether the ambiguous error corrected IMU heading is substantially in the true direction of the nose of the vehicle or substantially opposite to the true direction of the nose of the vehicle;
  calculating an unambiguous heading direction being either:
    the ambiguous error corrected IMU heading; or
    the ambiguous error corrected IMU heading offset by 180 degrees, if the ambiguous error corrected IMU heading was determined to be substantially opposite to the true direction of the nose of the vehicle; and
  comparing the unambiguous heading direction with the GNSS direction of motion of the vehicle, thereby to determine if the vehicle is travelling forward or in reverse.

Preferably, the method includes determining that the vehicle is travelling in reverse if the unambiguous heading direction is in substantially the opposite direction to the GNSS direction of motion.

Determining whether the ambiguous error corrected IMU heading is substantially in the true direction of the nose of the vehicle or substantially opposite to the true direction of the nose of the vehicle preferably includes approximating the true heading of the vehicle using one or more absolute heading tests or relative vehicle motion tests.

Determining whether the ambiguous error corrected IMU heading is substantially in the true direction of the nose of the vehicle or substantially opposite direction to the true direction of the nose of the vehicle preferably further includes comparing the approximated true heading of the vehicle with the ambiguous error corrected IMU heading.

In yet another form, the invention resides in a method of clamping an heading alignment error, the method including:
  determining a heading alignment error being the difference between a GNSS direction of motion of the vehicle and an unresolved IMU heading of the vehicle;
  adjusting the heading alignment error by 180 degrees to be within a predetermined range if the error is outside the predetermined range.

In still another form, the invention resides in a system for use in determining an unambiguous heading direction of a vehicle, the system including:
  a GNSS unit mounted to the vehicle, the GNSS unit operable to calculate the direction of motion of the vehicle;
  an IMU unit mounted to the vehicle, the IMU unit operable to calculate an unresolved IMU heading of the vehicle;
  a processing module including a processor programmed to:
    determine a heading alignment error being the difference between the GNSS direction of motion and the unresolved IMU heading;
    adjust the heading alignment error by 180 degrees to be within a predetermined range if the error is outside the predetermined range;
    adjust the unresolved IMU heading using the heading alignment error,
    determining whether the unresolved IMU heading is substantially in the true direction of the nose of the vehicle or substantially opposite to the true direction of the nose of the vehicle;
    calculate an unambiguous heading by offsetting the unresolved IMU heading by 180 degrees if the unresolved IMU heading is substantially opposite to the true direction of the nose of the vehicle.

The processor is preferably programmed to adjust the unresolved IMU heading by calculating an ambiguous error corrected IMU heading using the heading alignment error.

The processor is preferably programmed to calculate the unambiguous heading direction being either:
  the ambiguous error corrected IMU heading; or
  the ambiguous error corrected IMU heading offset by 180 degrees, if the ambiguous error corrected IMU heading was determined to be substantially in the opposite direction to the true direction of the nose of the vehicle.

The processor is preferably programmed to determine whether the vehicle is travelling in forward or reverse by comparing the unambiguous heading direction with the GNSS direction of motion of the vehicle.

The predetermined range is preferably between a $\geq -90$ degrees and $\leq +90$ degrees.

BRIEF DESCRIPTION OF THE DRAWINGS

By way of example only, preferred embodiments of the invention will be described more fully hereinafter with reference to the accompanying figures, wherein:

FIG. 5A is a plan view of a vehicle during coarse alignment of the IMU of the vehicle, the vehicle is shown travelling in a Southerly direction in reverse;

FIG. 5B is a plan view of the vehicle of FIG. 5A travelling forward in an Easterly direction;

FIG. 6A is a plan view of a vehicle during coarse alignment of the IMU of the vehicle, the vehicle is shown travelling forward in a Northerly direction;

FIG. 6B is a plan view of the vehicle of FIG. 6A travelling forward in an Easterly direction;

FIG. 7A is a plan view of a vehicle during coarse alignment of the IMU of the vehicle, the vehicle is shown travelling in a Southerly direction in reverse;

FIG. 7B is a plan view of the vehicle of FIG. 7A travelling in an Westerly direction in reverse.

DETAILED DESCRIPTION OF THE DRAWINGS

Figure 1:
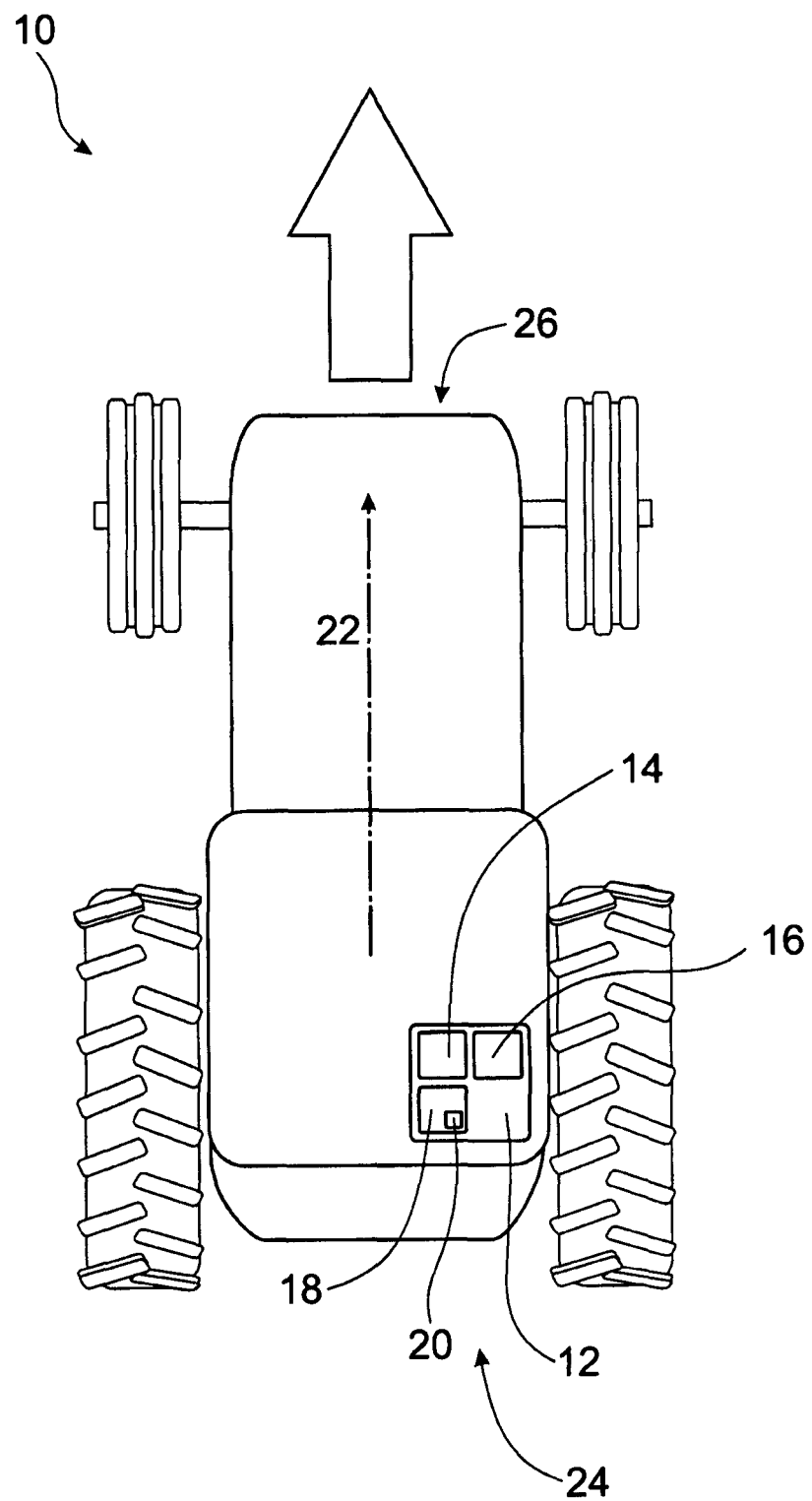
FIG. 1 is a diagrammatic top view of a vehicle including a system in accordance with one embodiment invention.

FIG. 1 shows a vehicle 10 including a forward/reverse state detection system 12 for determining if the vehicle is travelling in forward or reverse. In order to determine the forward/reverse state, the system 12 determines an unambiguous heading direction of the vehicle 10. The system 12 comprises a Global Navigation Satellite Systems (GNSS) unit 14, an IMU (Inertial Measurement Unit) unit 16 and a processing module 18. The processing module 18 is in communication with the GNSS unit 14 and the IMU unit 16.

The GNSS unit 14 uses satellite signals to calculate the speed and the direction of travel of the GNSS unit 14. The GNSS unit 14 will typically be a GPS receiver using GPS satellites to calculate and output the speed and the direction of travel. The GNSS unit 14 is mounted to the vehicle 10. The direction of travel of the GNSS unit 14 is thus considered to be the direction of motion of the vehicle 10. The GNSS direction of motion is insensitive to the vehicle travelling in forward or reverse, as it takes into account only the relative change in position of the GNSS antenna itself. Considering only the GNSS direction of motion does not reveal whether the velocity provided by the GNSS unit 14 is due to forward or reverse travel of the vehicle 10. The GNSS direction of motion of the vehicle 10 is transmitted to the processing module 18 as a GNSS direction of motion input.

The IMU unit 16 comprises a number of sensors for determining the attitude of the vehicle, including the unresolved IMU heading of the vehicle. The heading of the vehicle is the direction the nose of the vehicle is pointing. The sensors include gyros and accelerometers as is well known in the art. The true heading of the vehicle 10 is indicated by arrow 22 in FIG. 1 and is the true direction of the nose of the vehicle. The true heading 22 is along the longitudinal axis from the rear 24 of the vehicle 10 to the front 26 at the nose of the vehicle 10. The heading of the vehicle 10, as approximated by the IMU unit 16, is transmitted to the processing module 18 as an unresolved IMU heading input. The IMU unit 16 always estimates the true heading 22, irrespective of whether the vehicle 10 is travelling forward or in reverse. When a vehicle is travelling in reverse in a straight line, the GNSS direction of motion and the IMU heading will usually be approximately 180° opposite each other.

The IMU unit 16 requires a coarse alignment of the heading of the vehicle when the vehicle 10 starts up. The coarse alignment may be the first GNSS direction of motion of the vehicle 10, or be the direction of the nose of the vehicle as determined by a compass of the vehicle 10. An unresolved IMU heading at any given time is generally calculated as the coarse alignment heading adjusted by angular change measured by a gyro up to the given time.

The processing module 18 includes a processor 20 on which a software program is executed to program the processor 20 to execute logic steps and calculations. The processor 20 receives the GNSS direction of motion as an input and the unresolved IMU heading as an input. The processor 20 uses the GNSS direction of motion, the unresolved IMU heading and various other inputs and logic to determine whether the vehicle 10 is travelling in forward or reverse.

Figure 2:
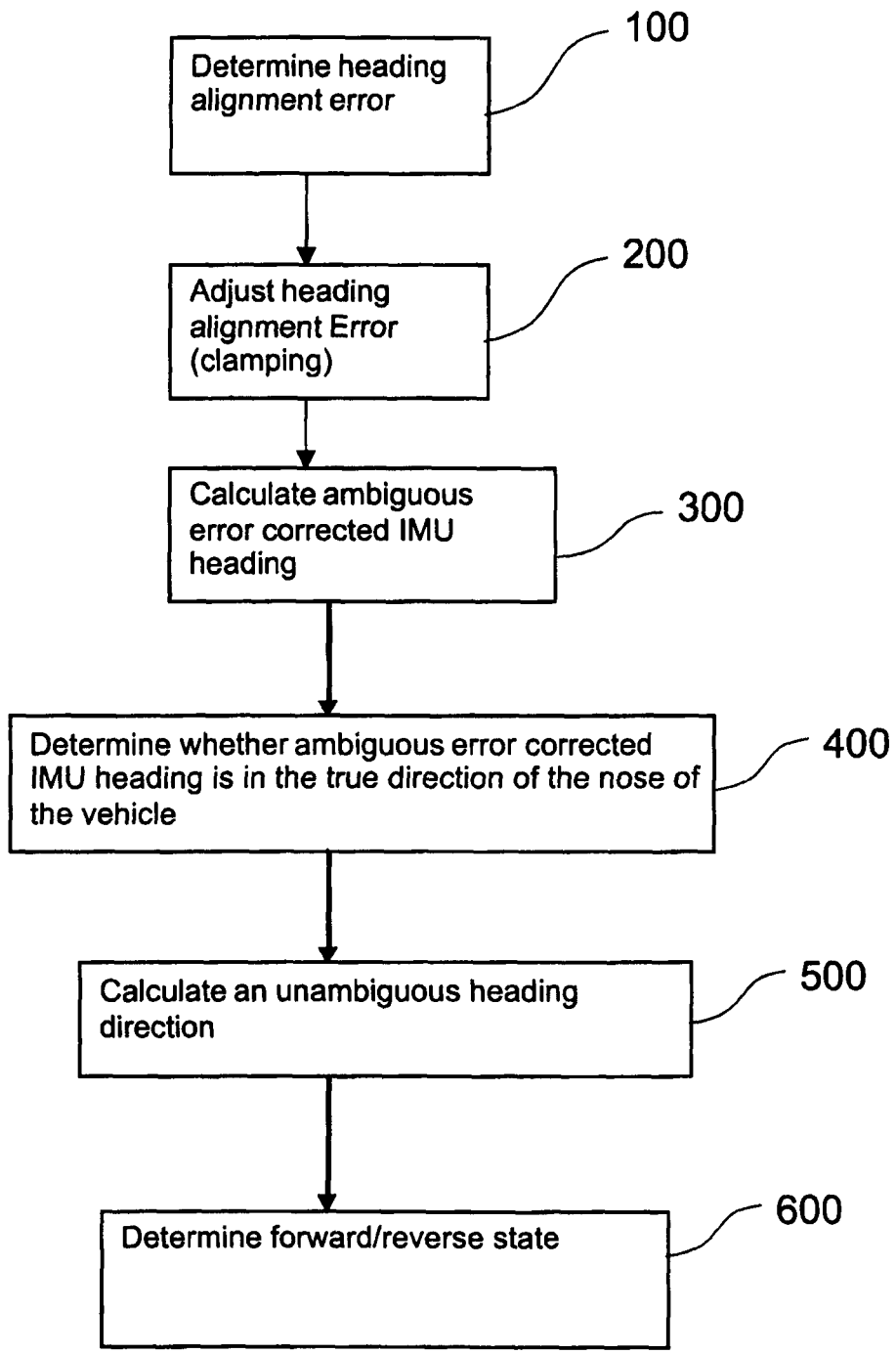
FIG. 2 is a general flow diagram of the method of determining an unambiguous heading direction of the vehicle of FIG. 1 and determining whether the vehicle is travelling forward or in reverse.

FIG. 2 shows a basic flow diagram of how the system 12 determines an unambiguous heading direction of the vehicle of FIG. 1 and determines whether the vehicle 10 is travelling forward or in reverse. The steps in the flow diagram are steps executed by the processor 20 of the processing module 18 of the vehicle 10.

At a first step 100, a heading alignment error is determined. The heading alignment error is the difference between a GNSS direction of motion of the vehicle and the unresolved IMU heading of the vehicle.

At a second step 200, the heading alignment error is adjusted by 180° to be within a predetermined range if the error is outside the predetermined range. If the heading alignment error is within the predetermined range then the heading alignment error is not adjusted (or it can be said to be adjusted by 0°)

At a third step 300 the unresolved IMU heading of the vehicle 10 is adjusted using the heading alignment error to determine an ambiguous error corrected IMU heading.

At a fourth step 400 it is determined whether the ambiguous error corrected IMU heading is substantially in the true direction of the nose of the vehicle 10 or substantially opposite to the true direction of the nose of the vehicle 10.

At a fifth step 500, the unambiguous heading direction is calculated by offsetting the ambiguous error corrected IMU heading by 180 degrees if the ambiguous error corrected IMU heading is substantially opposite to the true direction of the nose of the vehicle 10.

As a last step 600, the forward/reverse state of the vehicle 10 is determined by comparing the unambiguous heading direction with the GNSS direction of motion of the vehicle.

Figure 3:
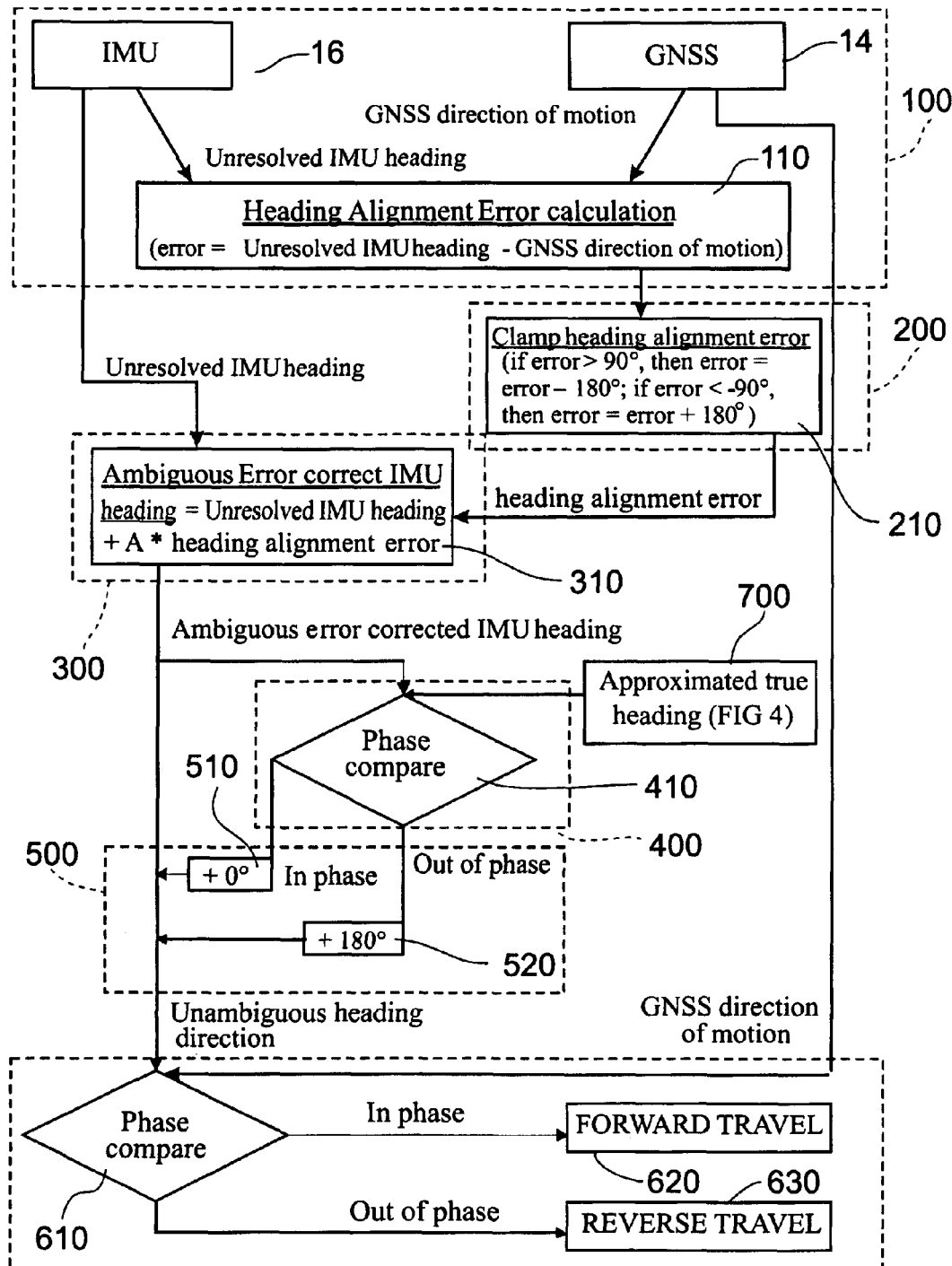
FIG. 3 is a more detailed flow diagram of the method of determining an unambiguous heading direction of the vehicle of FIG. 1 and determining whether the vehicle is travelling forward or in reverse.

The steps 100 to 600 are discussed in more detail and expanded upon with reference to FIG. 3.

FIG. 3 shows a detailed flow diagram of the method of determining the forward/reverse state of the vehicle 10. The general steps 100 to 600 of FIG. 2 are indicated by broken-line boxes in FIG. 2.

At step 100, a heading alignment error calculation 110 is performed. The processor 20 calculates the heading alignment error, which is the difference between the unresolved IMU heading and the GNSS direction of motion. The unresolved IMU heading is received from the IMU unit 16 and the GNSS direction of motion from the GNSS unit 14. The calculation of the heading alignment error is expressed as: heading alignment error=unresolved IMU heading−GNSS direction of motion.

At step 200, the heading alignment error is adjusted (if necessary) by a half circle of 180° to be within a predetermined range of between $\geq-90°$ to $\leq+90°$ if the error is outside this range. Adjusting the heading alignment error to be within the $\geq-90°$ to $\leq+90°$ range is referred to as clamping the error 210.

Clamping the error 210 is logically expressed as:
if error $>+90°$, then error=error−180°;
if error $<-90°$, then error=error+180°.
This calculation can either be performed iteratively, or by using the remainder of a division operation, since both techniques are mathematically equivalent.

Clamping the heading alignment error 210 forces the heading alignment error to always be within the range of between $\geq-90°$ to $\leq+90°$. If the heading alignment error is within $\geq-90°$ to $\leq+90°$ before clamping then the heading alignment error is not adjusted. Importantly, the error is clamped within the range of between $\geq-90°$ to $\leq+90°$, regardless of whether the vehicle 10 is travelling forward or in reverse and regardless of detection of the forward/reverse state of the vehicle.

At step 300 the unresolved IMU heading is solved by calculating 310 an ambiguous error corrected IMU heading using the heading alignment error (whether adjusted or not). The ambiguous error corrected IMU heading is the unresolved IMU heading as received from the IMU 16, corrected by an error term, ie:
ambiguous error corrected IMU heading=unresolved IMU heading−A*heading alignment error. A is typically constant less than 0.1 in the case of a complementary filter, and in the case of a Kalman filter the value of A will change over time as the filter converges. For the purpose of clarity in this document it is treated as a constant.

The next step 400 is to determine whether the ambiguous error corrected IMU heading is substantially in the direction of the true heading 22 of the vehicle 10 or substantially in the opposite direction to the true heading 22. This involves phase comparing 410 the ambiguous error corrected IMU heading with an approximated true heading 700 of the vehicle 10. The approximated true heading 700 is calculated using a number of tests and sensors as is described with reference to FIG. 4. The ambiguous error corrected IMU heading is in phase with the approximated true heading 700 of the vehicle if the ambiguous error corrected IMU heading is within $\geq-90°$ to $\leq+90°$ of the approximated true heading 700. If the ambiguous error corrected IMU heading is outside $\geq-90°$ to $\leq+90°$ of the approximated true heading 700 then it is out of phase.

The next step 500 is calculating the unambiguous heading direction. Calculation of the unambiguous heading direction is dependant on whether the ambiguous error corrected IMU heading was found to be in phase with the approximated true heading 700 of the vehicle 10 or not.

If the ambiguous error corrected IMU heading was found to be in phase with the approximated true heading 700, then the ambiguous error corrected IMU heading is the unambiguous heading direction. This is represented by the addition of 0° to the ambiguous error corrected IMU heading at step 510.

If the ambiguous error corrected IMU heading was found to be out of phase with the approximated true heading 700, then the unambiguous heading direction is the ambiguous error corrected IMU heading offset by 180°. This is represented by the addition of 180° to the ambiguous error corrected IMU heading at step 520.

Lastly, the unambiguous heading direction is compared with the GNSS direction of motion of the vehicle at step 600, thereby to determine if the vehicle is travelling forward or in reverse. The phase of the unambiguous heading direction and the GNSS direction of motion is compared at step 610. If the unambiguous heading direction is in phase with the GNSS direction of motion of the vehicle, then the vehicle is travelling forward 620, else it is travelling in reverse 630.

The method of forward/reverse state determination of the present invention avoids large jumps in the heading alignment error, without having to rely on vehicle forward/reverse state determination to correct the GNSS direction of motion input prior to the heading alignment error calculation. This is achieved by clamping the error term at step 210, as opposed to correcting the GNSS direction of motion for forward and reverse. The proposed method of determining forward/reverse state is potentially faster, more accurate and more reliable than known methods.

Figure 4:
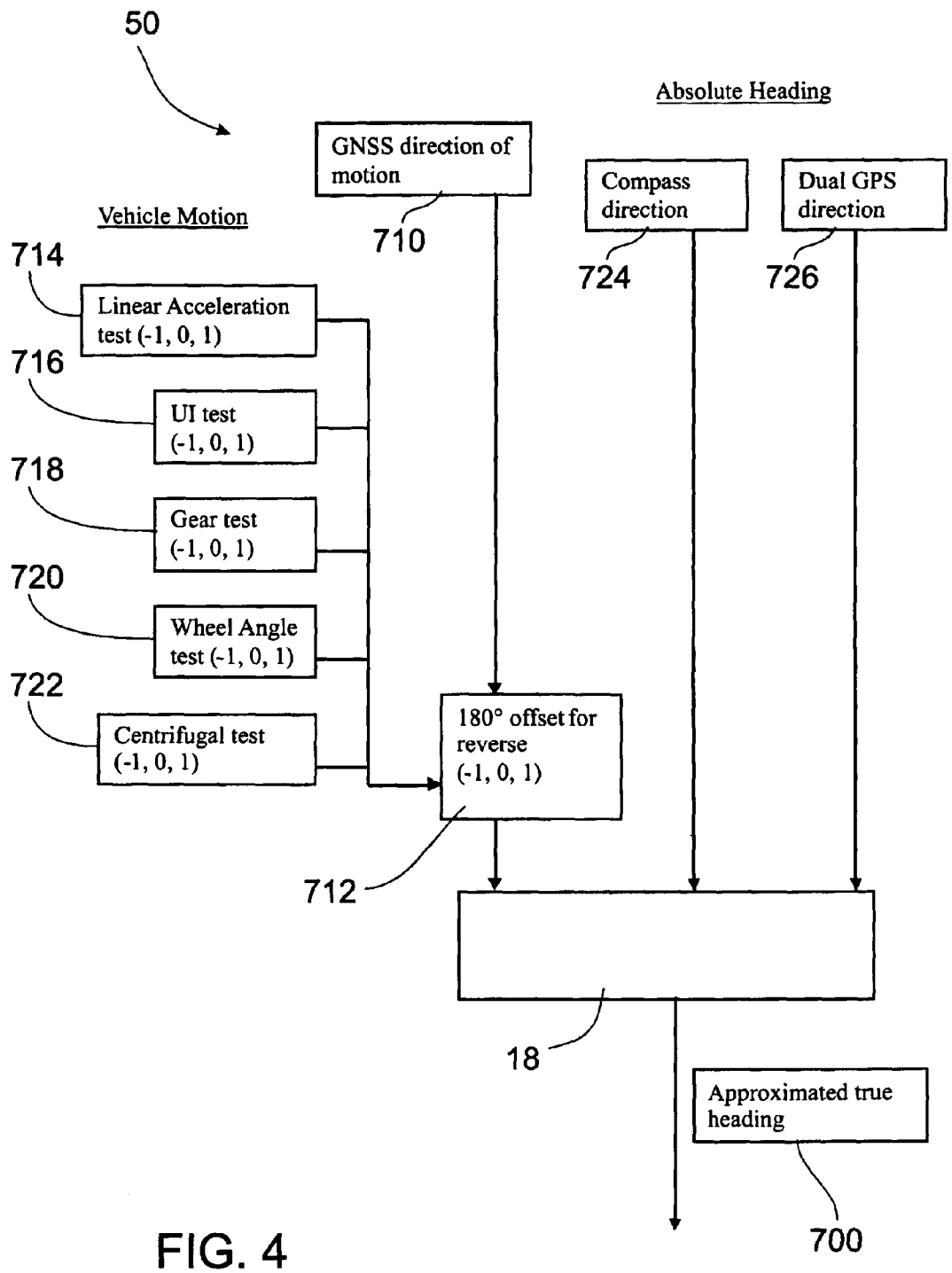
FIG. 4 is a flow diagram of a method of approximation of the true heading of a vehicle, used as an input to the method illustrated in FIG. 3.

FIG. 4 shows a flow diagram 50 of how the approximated true heading 700 is calculated by approximating the true heading 22 of the vehicle 10. The approximated true heading 700 may be calculated in a number of ways using a number of sensors and tests.

When the vehicle 10 is in motion above a certain speed, the GNSS direction of motion 710 can be used as the approximated true heading 700 only if the forwards/reverse state can be reliably known 100% of the time. Since this can not be guaranteed based on GNSS measurements alone, the GNSS direction of motion 710 is always treated as an ambiguous quantity.

Determining the forward/reverse state of the vehicle 10 for approximating the true heading 700 comprises weighting a number of tests 714-722. The tests each give a result of "1" for forward, "0" for unknown direction, and "−1" for reverse. The collection will not always consist of a full set of sensor readings, and is therefore designed to be tolerant of missing sensor measurements caused by sensors malfunctioning, sensors not being ready yet or sensors simply not having been installed with the system.

The linear acceleration test 714 compares changes in velocity with changes in integrated accelerometer readings to determine if the vehicle 10 is travelling forward or in reverse.

The UI test 716 uses the input from a driver of the vehicle 10 to determine forward or reverse travel. A user interface (UI) is provided for the driver to indicate whether the vehicle is travelling forward or in reverse.

The gear test 718 has as an input the position of the FNR lever of the vehicle 10. The FNR lever can be in either a "Forward", "Neutral" or "Reverse" position. If the FNR lever is in its "Forward" position, the gear test 718 gives a result of "1" for forward. If the FNR lever is in its "Reverse" position, the gear test 718 gives a result of "−1" for reverse. If the FNR lever is in its "Neutral" position, the gear test 718 gives a result of "0" for unknown.

The wheel angle test 720 takes the speed of the vehicle 10 as measured from the gearbox, ground speed radar, or other sensor, and the steering angle from the steering subsystem and compares calculates an estimated yaw rate if the vehicle is assumed to be going in a forwards direction. This estimated yaw rate is compared with the yaw rate as measured by rate gyros of the vehicle and if the two quantities are in significantly different directions, the vehicle is determined to be travelling in reverse.

Figure 8:
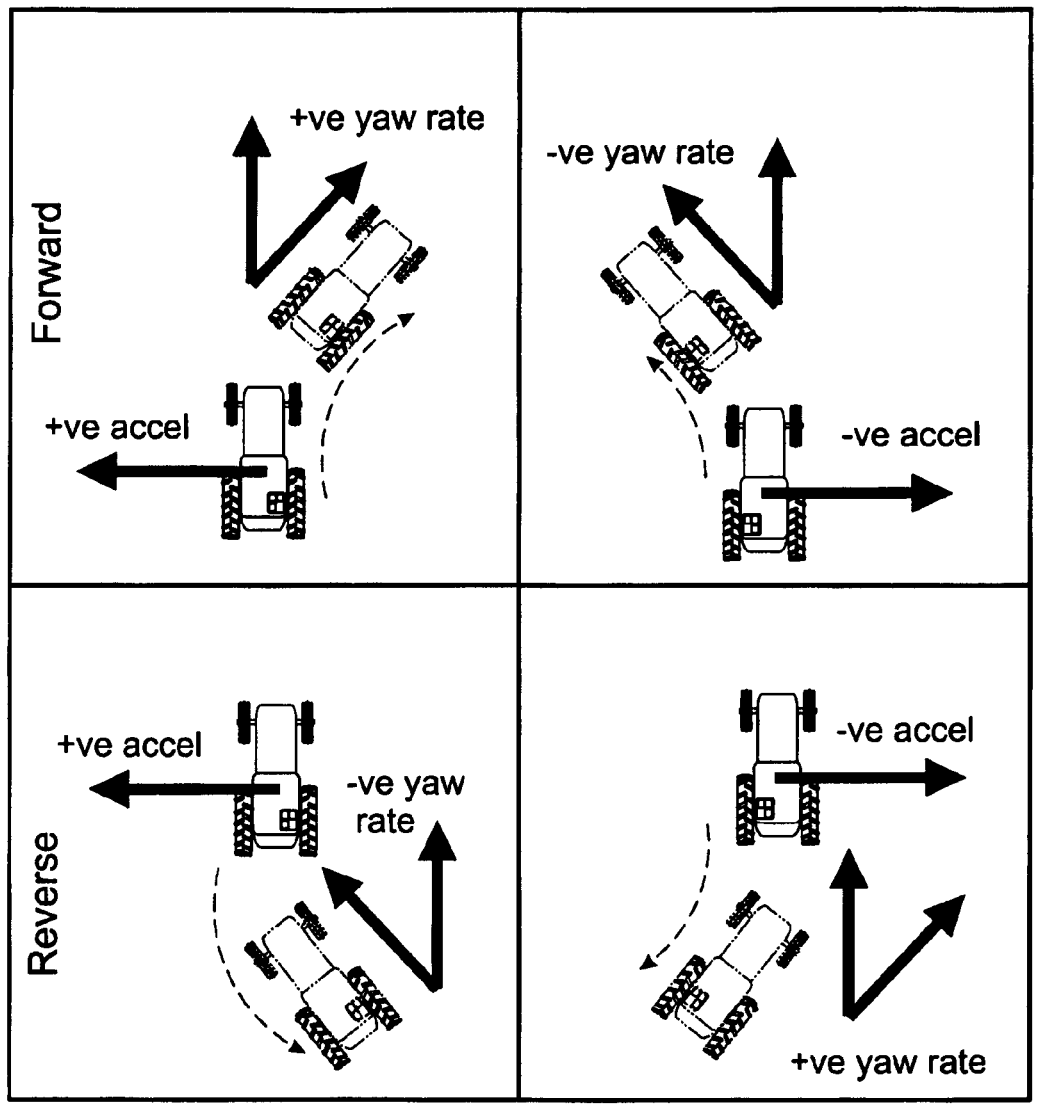
FIG. 8 is diagrammatic layout showing the changes in sign (+ or −) of the yaw rate and lateral acceleration during different forwards and reverse conditions of the vehicle of FIG. 1.

The centrifugal test 722 compares the sign (+ or −) of the yaw rate of the IMU 16 with the sign (+ or −) of lateral acceleration measured by an accelerometer of the IMU 16. If the signs of the yaw rate and lateral acceleration match, then the vehicle 10 is travelling forwards. If the signs of the yaw rate and lateral acceleration differ, then the vehicle 10 is travelling in reverse. FIG. 8 shows the changes in sign depending on forward or reverse travel. The yaw rate and lateral acceleration have to be above a preset threshold when the vehicle is turning for this test to be relevant.

The different tests 714-722 are weighed to determine the forward/reverse state of the vehicle 10 and the GNSS direction of motion appropriately corrected by a 180° if the vehicle is in reverse. It should be noted that this step is performed significantly after any heading alignment error calculations in the IMU, and that this adjusted GNSS direction of motion specifically does not feed back to error correct the unresolved IMU heading.

Under certain circumstances the compass direction 724 received from a digital compass in the vehicle may be used to approximate the true heading 22. This is especially so for low vehicle speeds.

The vehicle may include a dual GPS system having two GPS receivers, each having an antenna. The processing module 18 can determine a Dual GPS direction 726 for the vehicle 10 from the inputs of the two receivers, as is well known in the art.

The compass direction 724, dual GPS direction 726, and GNSS direction of motion (corrected for forward/reverse state) are all selectively used by the processing module 18 to determine an approximated true heading 700. The processing module 18 may combine the compass direction 724, dual GPS direction 726, and GNSS direction of motion using various types of algorithms to arrive at the approximated true heading 700

Examples 1 to 3 below describes a number of scenarios using the method of the present invention.

Example 1

FIG. 5A. 5B

Example 1 is a case of forward/reverse state determination where the IMU coarse alignment (at time t=0) was outside +/−90° of the true heading 22 of the vehicle 10 and the vehicle 10 is travelling forwards at a later time (time=t+1). The orientation and direction of motion of the vehicle 10 at coarse alignment is shown in FIG. 5A and the orientation and direction of motion of the vehicle at the later time is shown in FIG. 5B.

At start-up (FIG. 5A), the vehicle is shown travelling in a Southerly direction (180°) in reverse. The true heading 22=0° (North) and the IMU coarse alignment=180° (South). This is an example where the coarse alignment is taken as the first GNSS direction of motion signal and the first action after starting up the vehicle 10 is reversing the vehicle 10 out of a shed.

At the later time (FIG. 5B, time t+1), the true heading 22 of the vehicle is 90° (East) and the vehicle 10 is travelling forwards. The unresolved IMU heading=(IMU coarse alignment [t=0])+(IMU gyro yaw rate [t+1]). So for an example where at the later time the nose has turned+90° as measured by the IMU gyro, unresolved IMU heading (t+1)=180°+90°=270°. The true heading 22 of the nose at the later time is actually 90°.

In the example of FIG. 5, we assume that the GNSS direction of motion at the later time (t+1)=90°

Referring to FIGS. 3 and 5B, the heading alignment error calculation 110 at the later time (t+1)=unresolved IMU heading−GNSS direction of motion. Heading alignment error=270°−90°=180°.

The heading alignment error is outside the ≥−90° to ≤+90° predetermined range. In step 210 the heading alignment error is thus clamped so that heading alignment error=180°−180°=0°.

Ambiguous error corrected IMU heading as per step 310=Unresolved IMU heading−A*heading alignment error. Ambiguous error corrected IMU heading (t+1)=270°−0°=270°.

Using the heuristic algorithm described with reference to FIG. 4, the approximated true heading 700 is determined, for example, to be 93°. The difference between the ambiguous error corrected IMU heading (270°) and the approximated true heading 700 (93°) is 177°, which is out of phase as compared at step 410.

Where the ambiguous error corrected IMU heading is out of phase with the approximated true heading 700, the unambiguous heading direction is the ambiguous error corrected IMU heading offset by 180°. Unambiguous heading direction=270°+180°=90°.

A comparison between the unambiguous heading direction (90°) and the GNSS direction of motion (90°) at step 610 finds the two to be in phase, resulting in the system 12 correctly determining the forward/reverse state to be forward travel at the later time (t+1).

Example 2

FIG. 6A, 6B

Example 2 is the same as example 1, except that the initial IMU coarse alignment is within +/−90° of the true heading 22 of the vehicle 10.

The orientation and direction of motion of the vehicle 10 at coarse alignment is shown in FIG. 6A and the orientation and direction of motion of the vehicle at the later time is shown in FIG. 6B.

At start-up (FIG. 6A), the vehicle 10 is shown travelling forward in a Northerly direction (0°). The true heading 22=0° (North) and the IMU coarse alignment=2°. This is an example where the coarse alignment is taken as the first GNSS direction of motion signal and the first motion of the vehicle after start up is forward motion.

At the later time (FIG. 6B, time=t+1) the true heading 22 of the vehicle is 90° and the vehicle 10 is travelling forwards. The unresolved IMU heading=(IMU coarse alignment [t=0])+(IMU gyro yaw rate [t+1]). So for the example where at the later time the nose has turned+90° as measured by the IMU gyro, unresolved IMU heading (t+1)=2°+90°=92°. The true heading 22 of the nose at the later time is 90°. Assuming the GNSS unit 14 is accurate, the GNSS direction of motion at the later time is also 90°.

Referring to FIGS. 3 and 6B, the heading alignment error calculation 110 at the later time (t+1)=unresolved IMU heading−GNSS direction of motion. Heading alignment error=92°−90°=2°.

The heading alignment error is smaller than 90°. In step 210 the heading alignment error need not be clamped so that heading alignment error=2° remains.

Ambiguous error corrected IMU heading as per step 310=unresolved IMU heading−A*heading alignment error. Ambiguous error corrected IMU heading [t+1]=92°−0.1*2°=91.8°

Assume the approximated true heading 700 is 93° as calculated with reference to FIG. 4. The difference between the ambiguous error corrected IMU heading (91.8°) and the approximated true heading 700 (93°) is 2.2°, so the two are in phase as compared at step 410.

Where the ambiguous error corrected IMU heading is in phase with the approximated true heading 700, the unambiguous heading direction is the ambiguous error corrected IMU heading offset by 0°. Unambiguous heading direction=91.8°+0°=91.8°.

A phase comparison between the unambiguous heading direction) (91.8°) and the GNSS direction of motion (90°) at step 610 finds the two to be in phase, resulting in the system 12 to correctly determine the forward/reverse state to be forward travel.

Example 3

FIG. 7A. 7B

Example 3 is the same as example 1, except the vehicle 10 is travelling in reverse at the later time (FIG. 7B, t+1). The vehicle 10 orientation during coarse alignment is shown in FIG. 7A, which is the same coarse alignment as shown and discussed with reference to in FIG. 5A. A real-world example of this would be if the vehicle started in reverse gear and stayed that way all day.

At the later time (FIG. 7B) the true heading 22 of the vehicle is 90° (East) and the vehicle 10 is travelling in reverse. The unresolved IMU heading=(IMU coarse alignment [t=0])+(IMU gyro yaw rate (t+[1]). For this example where at the later time the nose has turned +90° as measured by the IMU gyro, unresolved IMU heading at the later time=180°+90°=270°. Assuming the GNSS unit 14 is accurate, then the GNSS direction of motion at the later time=270°

Referring to FIGS. 3 and 7B, the heading alignment error calculation 110 at the later time t+1=unresolved IMU heading−GNSS direction of motion. Heading alignment error=270°−270°=0°.

The heading alignment error is smaller than +90° but bigger than −90°, so within the predetermined range. In step 210 the heading alignment error need not be clamped so that the heading alignment error remains as 0°.

Ambiguous error corrected IMU heading as per step 310=IMU heading−A*heading alignment error. Ambiguous error corrected IMU heading=270°−=270°.

Assume the approximated true heading 700 at the later time t+1 is 93° as calculated with reference to FIG. 4. The difference between the ambiguous error corrected IMU heading (270°) and the approximated true heading (93°) is 177°, so the two are out of phase as compared at step 410.

Where the ambiguous error corrected IMU heading is out of phase with the approximated true heading 700, the unambiguous heading direction is the ambiguous error corrected IMU heading offset by 180°. Unambiguous heading direction at the later time t+1=270°+180°=90°.

A comparison between the unambiguous heading direction (90°) and the GNSS direction of motion (270°) at step 610 finds the two to be out of phase, resulting in the system 12 determining the forward/reverse state at the later time t+1 to be reverse travel.

One of the benefits of the system 12, is that the heading alignment error used in calculating the ambiguous error corrected IMU heading is always limited to within ≥−90° to ≤+90°, without having to determine the instantaneous forward/reverse state of the vehicle. The error term is thus kept small and the ambiguous error corrected IMU heading is only solved for forward/reverse travel at a later step. Instead of instantaneous forward/reverse detection to correct the heading alignment error, the present invention determines an approximated true heading for phase comparison as described. This has the benefit that the system is insensitive to rapid changes in the GNSS direction of motion, as is typically the case when, for example, the vehicle brakes are rapidly applied while in motion, causing significant rocking/bouncing forwards and backwards on the vehicle tires and suspension system. Such rapid changes in GNSS direction of motion are not uncommon in precision agriculture. This would previously manifest itself as large values in the error term, which would in turn pull the value of IMU heading away from the true heading. The system also has a high tolerance for sparse sensor measurements, allowing the system to adapt to malfunctioning or missing sensors.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this invention is intended to embrace all alternatives, modifications and variations of the present invention that have been discussed herein, and other embodiments that fall within the spirit and scope of the above described invention.

The invention claimed is:

1. A method of determining an unambiguous heading direction of a vehicle, the method including:
   determining a heading alignment error being the difference between a Global Navigation Satellite System (GNSS) direction of motion of the vehicle and an unresolved Inertial Measurement Unit (IMU) heading of the vehicle;
   adjusting the heading alignment error by 180 degrees to be within a predetermined range if the error is outside the predetermined range;
   adjusting the unresolved IMU heading of the vehicle using the heading alignment error;
   determining whether the unresolved IMU heading, after heading alignment error adjustment, is substantially in the true direction of the nose of the vehicle or substantially opposite to the true direction of the nose of the vehicle; and
   calculating an unambiguous heading direction by offsetting the unresolved IMU heading, after heading alignment error adjustment, by 180 degrees if the unresolved IMU heading is substantially opposite to the true direction of the nose of the vehicle.

2. The method of claim 1, including determining if the vehicle is travelling in forward or reverse by comparing the unambiguous heading direction with the GNSS direction of motion of the vehicle.

3. The method of claim 1, wherein adjusting the unresolved IMU heading of the vehicle using the heading alignment error comprises calculating an ambiguous error corrected IMU heading using the heading alignment error.

4. The method of claim 3, wherein the unambiguous heading direction is calculated as being either:
   the ambiguous error corrected IMU heading; or
   the ambiguous error corrected IMU heading offset by 180 degrees, if the ambiguous error corrected IMU heading was determined to be substantially opposite to the true direction of the nose of the vehicle.

5. The method of claim 4, wherein determining whether the ambiguous error corrected IMU heading is substantially in the true direction of the nose of the vehicle or substantially opposite to the true direction of the nose of the vehicle preferably includes approximating the true direction of the nose of the vehicle using one or more absolute heading tests or relative vehicle motion tests.

6. The method of claim 5, including comparing the approximated true direction of the nose of the vehicle with the ambiguous error corrected IMU heading.

7. The method of claim 1, including determining that the vehicle is travelling in reverse if the unambiguous heading direction is in substantially the opposite direction to the GNSS direction of motion.

8. A method of determining if a vehicle is travelling forward or in reverse, the method including:
- receiving a Global Navigation Satellite System (GNSS) direction of motion for the vehicle from a GNSS unit of the vehicle;
- receiving an unresolved Inertial Measurement Unit (IMU) heading of the vehicle from an IMU of the vehicle;
- determining a heading alignment error being the difference between the GNSS direction of motion and the unresolved IMU heading;
- adjusting the heading alignment error by 180 degrees to be within a predetermined range if the heading alignment error is outside the predetermined range;
- calculating an ambiguous error corrected IMU heading using the heading alignment error;
- determining whether the ambiguous error corrected IMU heading is substantially in the true direction of the nose of the vehicle or substantially opposite to the true direction of the nose of the vehicle;
- calculating an unambiguous heading direction being either:
- the ambiguous error corrected IMU heading; or
- the ambiguous error corrected IMU heading offset by 180 degrees, if the ambiguous error corrected IMU heading was determined to be substantially opposite to the true direction of the nose of the vehicle; and
- comparing the unambiguous heading direction with the GNSS direction of motion of the vehicle, thereby to determine if the vehicle is travelling forward or in reverse.

9. The method of claim 8, including determining that the vehicle is travelling in reverse if the unambiguous heading direction is in substantially the opposite direction to the GNSS direction of motion.

10. The method of claim 8, wherein determining whether the ambiguous error corrected IMU heading is substantially in the true direction of the nose of the vehicle or substantially opposite to the true direction of the nose of the vehicle includes approximating the true direction of the nose of the vehicle using one or more absolute heading tests or relative vehicle motion tests.

11. The method of claim 10, including comparing the approximated true direction of the nose of the vehicle with the ambiguous error corrected IMU heading.

12. A method of clamping a heading alignment error, the method including:
- determining a heading alignment error being the difference between a GNSS direction of motion of the vehicle and an unresolved IMU heading of the vehicle being the unresolved direction the vehicle is pointing;
- adjusting the heading alignment error by 180 degrees to be within a predetermined range if the heading alignment error is outside the predetermined range.

13. The method of claim 12, including testing whether the heading alignment error is within the predetermined range of between ≥−90 degrees and ≤+90 degrees.

14. A system for use in determining an unambiguous heading direction of a vehicle, the system including:
- a GNSS unit mounted to the vehicle, the GNSS unit operable to calculate the direction of motion of the vehicle;
- an IMU unit mounted to the vehicle, the IMU unit operable to calculate an unresolved IMU heading of the vehicle;
- a processing module including a processor programmed to:
- determine a heading alignment error being the difference between the GNSS direction of motion and the unresolved IMU heading;
- adjust the heading alignment error by 180 degrees to be within a predetermined range if the error is outside the predetermined range;
- adjust the unresolved IMU heading using the heading alignment error,
- determining whether the unresolved IMU heading is substantially in the true direction of the nose of the vehicle or substantially opposite to the true direction of the nose of the vehicle;
- calculate an unambiguous heading by offsetting the unresolved IMU heading by 180 degrees if the unresolved IMU heading is substantially opposite to the true direction of the nose of the vehicle.

15. The system of claim 14, wherein the processor is programmed to adjust the unresolved IMU heading by calculating an ambiguous error corrected IMU heading using the heading alignment error.

16. The system of claim 15, wherein the processor is programmed to calculate the unambiguous heading direction being either:
- the ambiguous error corrected IMU heading; or
- the ambiguous error corrected IMU heading offset by 180 degrees, if the ambiguous error corrected IMU heading was determined to be substantially in the opposite direction to the true direction of the nose of the vehicle.

17. The system of claim 16, wherein the processor is programmed to determine whether the vehicle is travelling in forward or reverse by comparing the unambiguous heading direction with the GNSS direction of motion of the vehicle.

* * * * *